C. F. ECKART.
MULCH.
APPLICATION FILED SEPT. 27, 1920.

1,372,999.

Patented Mar. 29, 1921.
2 SHEETS—SHEET 1.

Inventor.
Charles F. Eckart
by Chas J. Neill
Atty

C. F. ECKART.
MULSH.
APPLICATION FILED SEPT. 27, 1920.

1,372,999.

Patented Mar. 29, 1921.
2 SHEETS—SHEET 2.

Inventor:
Charles F. Eckart
By Chas. J. O'Neill
Atty.

UNITED STATES PATENT OFFICE.

CHARLES F. ECKART, OF OLAA, TERRITORY OF HAWAII.

MULSH.

1,372,999.   Specification of Letters Patent.   Patented Mar. 29, 1921.

Application filed September 27, 1920. Serial No. 413,174.

*To all whom it may concern:*

Be it known that I, CHARLES F. ECKART, a citizen of the United States, residing at Olaa, Territory of Hawaii, (whose post-office address is Olaa, Hawaii, Territory of Hawaii,) have invented certain new and useful Improvements in Mulshes; and I do hereby declare the following to be a full, clear, and exact description of the invention, such as will enable others skilled in the art to which it appertains to make and use the same.

The invention relates to improvements in mulshes for forcing or enhancing the growth of plants, first by suppressing weeds and undesirable plants in or about the planting area, second by producing zones of moisture stored within the soil outside of the planting area and the regulation of the quantity of moisture thus stored by the provision of adjustable openings in the mulsh to expose larger or smaller areas of the soil to induce evaporation of the excess moisture, and third by inducing the storage of heat in the soil, which heat is absorbed by the body of the mulsh and radiated or conducted into the soil, so that practically ideal conditions as to heat and moisture will be maintained, to enhance the lateral and downward spreading of the plant roots, and therefore the development of the plant as a whole. The present invention is designed and intended to afford another means for putting into practical effect the method of enhancing the growth of plants, as set forth in my copending application filed on even date herewith, and to provide additional means for accurately regulating the condition of the soil zones surrounding the indivdual plants, in respect of moisture and temperature conditions, with due consideration to the weather conditions and the nature of the plants.

To these ends the invention comprises a mulsh or covering for the plant beds, preferably formed of strips of flexible, dark colored, water-proof material of good heat absorbing qualities, from which sections are excised at regular intervals, each excised section being adjustable with respect to the mulsh proper to either substantially close the opening formed by the excision thereof, or to expose soil areas of varying extent to induce evaporation of the moisture from the soil, which has been delivered to the soil by drainage from the surface of the mulsh, either through the slits or incisions formed when the sections are severed from the body of the mulsh or through the openings produced by adjusting the severed sections to produce larger or smaller evaporation openings or areas. Each of the sections cut from the mulsh is provided with a central opening, formed in substantially the same manner as the planting opening, as described in my copending application aforesaid, namely by slitting each excised section of the mulsh on intersecting lines to form foldable flaps, which when turned back over the upper surface of the section are locked into position by passing the free ends through small slits in the mulsh section surrounding the central opening in which the plants or plant stock may be planted either prior or subsequent to the laying of the mulsh.

The invention is illustrated in the accompanying drawings, in which:—

Figure 1:
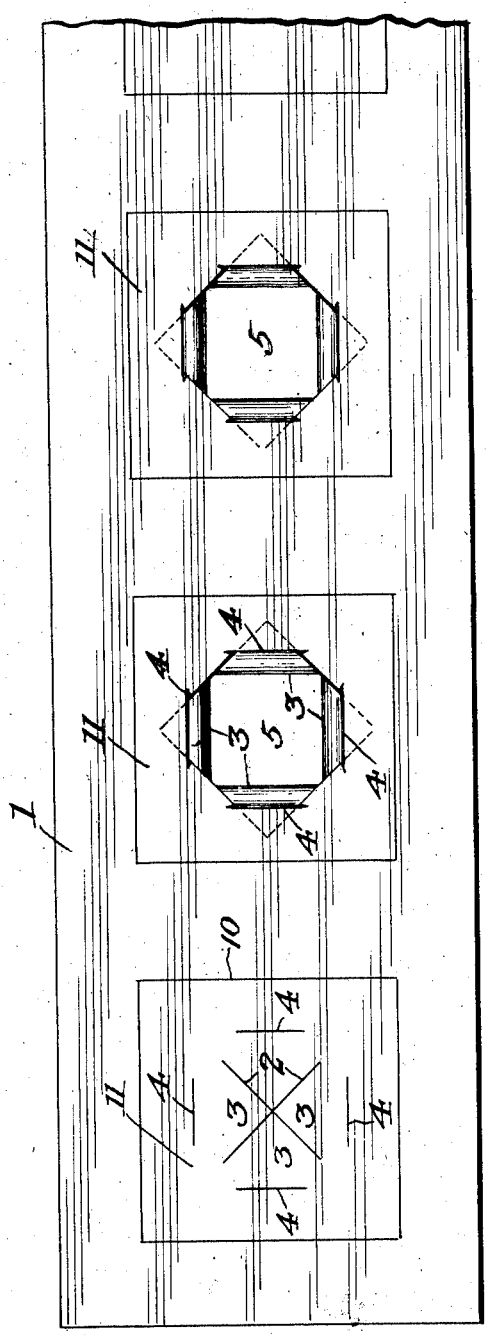
Figure 1 is a plan view of a section of a mulshing strip with the several sections surrounding the particular planting areas excised but remaining *in situ;*
Figure 2:
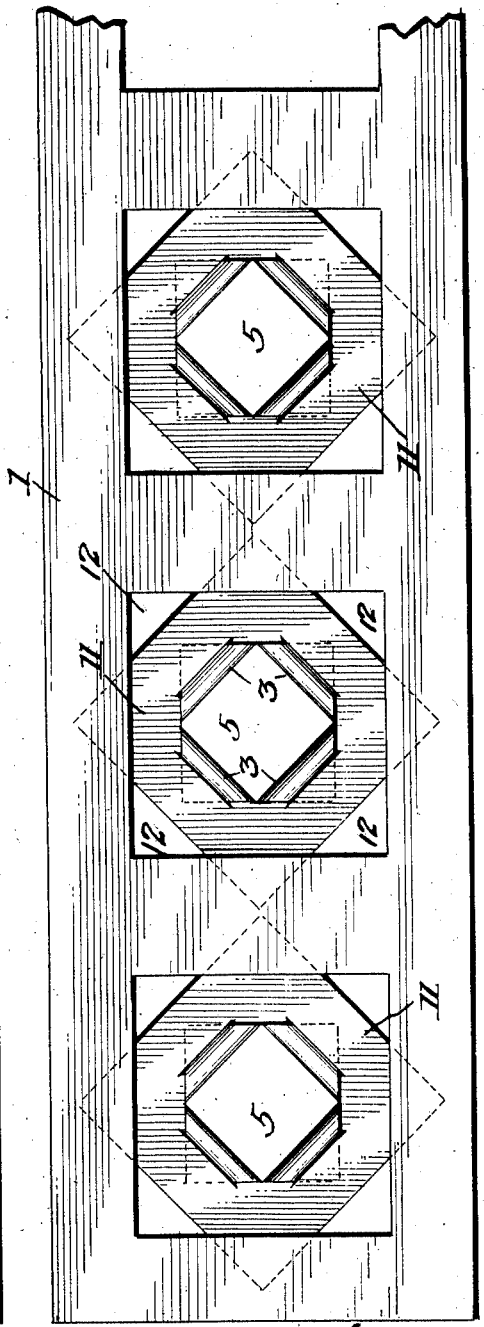
Fig. 2 is a similar view showing the excised sections adjusted to expose sections of the soil around the planting area to promote evaporation of the water in the soil.
Figure 3:
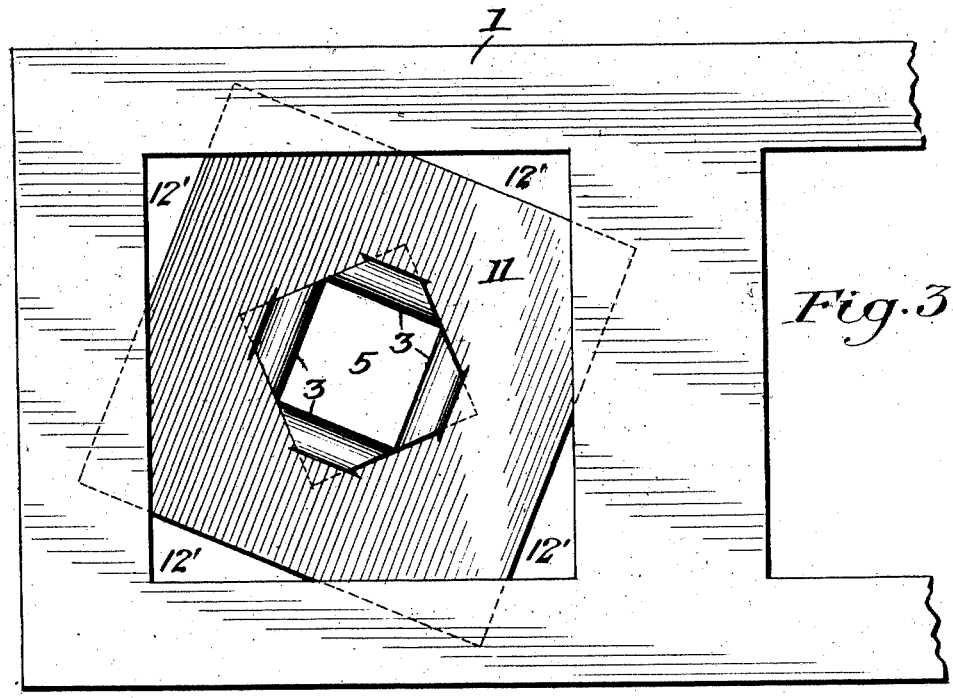
Fig. 3 is an enlarged view showing a different adjustment of the excised mulsh section to expose a different extent of evaporation area of the soil.

Referring to Figs. 1 to 3 of the drawings, 1 indicates the body proper of a mulshing strip, which is preferably formed of flexible, dark colored, water-proof material of good heat absorbing qualities, such as would be effected by impregnating the fabric of the mulshing strip with asphalt, tar or similar compounds. The strip as thus constituted is adapted to be laid in flat surface contact with the soil of the plant beds in the usual manner, primarily to suppress and destroy weeds and undesirable plants, as explained in my co-pending application.

Preferably at intervals, representing the location of the plants in the soil, the body of the mulsh is provided with cross slits 2, 2 which define the four triangular flaps 3, each of which is adapted to be folded back over the surface of the mulsh and the outer end thereof passed through small slits 4, thereby locking the flaps in position and exposing an area of soil immediately surrounding the plant, which latter may have been set in position either prior or subsequent to the laying of the mulsh, each so-called planting area being defined by the opening 5.

Regular geometrical sections of the mulsh proper, each section containing a series of foldable flaps defining a single planting opening 5, are excised from the body of the mulsh by cuts or slits 10, which in the embodiment illustrated in Figs. 1, 2 and 3 produces a square section 11 cut bodily from the mulsh. The various incisions to form the foldable flaps, the locking slits therefor and the separate sections 11 of the mulsh may be made when the mulsh is first prepared and before it is applied to the soil, or may be made after the mulsh has been laid on the ground over the plant beds and the latter freed from weeds or undesirable plants.

When the mulsh 1 has been applied to the soil in the form illustrated in Fig. 1 it will subserve the same purposes and functions as the mulsh illustrated in my co-pending application aforesaid in that the folded flaps will open up the soil area immediately surrounding the plants, the fabric of the mulsh will absorb the heat from the sun's rays and transmit the same to the subjacent soil, and the greater part of the moisture directed within the boundaries of the mulsh will be delivered into the soil through the planting opening 5, the slits 4 and the dividing slits or incisions 10 between the body of the mulsh and the sections 11. By far the larger proportion of the water will drain through these last mentioned slits 10 and will be delivered into the soil zones outside of the planting area, in practically the same manner and to the same effect as the drainage is affected through the slits or slots 10 in the mulsh of my co-pending application aforesaid. It will be apparent, however, that there will be times, after or during heavy or continuous rains, or conditions of plant development, when, or under which, it will prove necessary or desirable to permit some of the water trapped in the zones surrounding the planting areas to evaporate from the surface of the soil, so that the latter will not remain too wet for optimum plant development. This evaporation may be readily and accurately regulated by adjusting the several sections 11 of the mulsh from the relatively closed position thereof in the body of the mulsh, as illustrated in Fig. 1, to positions illustrated in Figs. 2 and 3, or in other words by turning the several sections 11 about each plant as a center to provide variable sized openings 12 or 12' between the body proper of the mulsh and the subjacent sections 11, as illustrated in Figs. 2 and 3. It will be apparent that the area of the openings 12 and 12' and therefore the soil areas exposed may be accurately regulated and varied to any desired extent so that the amount of evaporation of the water from the soil may be correspondingly regulated.

Figure 4:
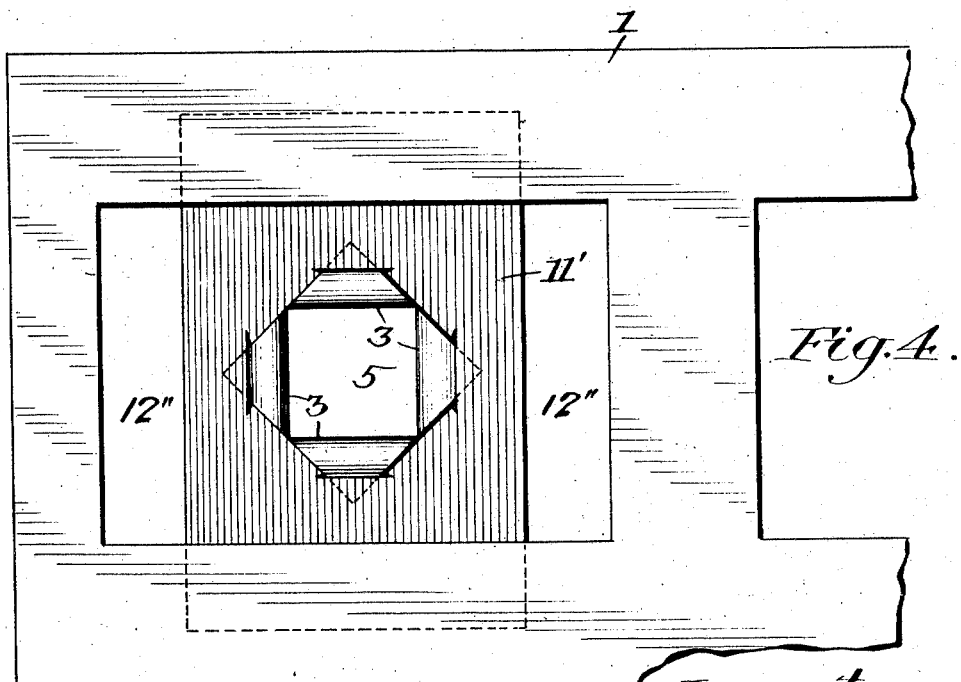
Fig. 4 is a similar view showing a modified form of the excised mulsh section to be used when relatively large evaporation areas are required.

Not only do the adjustments of the several mulsh sections 11, as shown in Figs. 2 and 3, cause the evaporation of the water from the soil to be materially increased over that which would take place under conditions represented by Fig. 1, but such adjustment likewise reduces the heat absorbing quality of the mulsh, in direct proportion to the enlargement of the openings 12 and 12', as the portions of each of the sections 11 which underlie the body proper of the mulsh will be no longer exposed to the direct action of the solar rays and the heat absorbed through the openings 12 and 12' will be quickly dissipated and cannot be stored in the soil for an appreciable time after the sun ceases to shine thereon. It will be seen, therefore, that by the proper adjustment of the mulsh sections 11 both moisture and temperature conditions of the soil may be accurately regulated and determined. As heretofore indicated the mulsh sections 11 may be of any convenient or desired geometrical form provided the form admits of them being so adjusted with respect to the openings in the mulsh, formed by their excision therefrom, as to permit the sections to substantially close the openings, except for the narrow variable openings through the mulsh to expose similarly variable evaporation areas of the soil. For example, when relatively large evaporation areas are desirable the excised sections of the mulsh may take the form shown in Fig. 4, in which each of the sections is oblong in form. When these sections are laid with their major axes at right angles to the major axis of the mulsh, maximum evaporation areas or openings 12" will be produced. These openings may be varied in size from a maximum to a minimum by turning the sections 11' in the same manner as indicated in connection with the previous modification.

It will thus be seen that by selecting the proper shape of the mulsh sections 11 and adjusting them with respect to the openings formed by their excision from the body of the mulsh, any desired degree or extent of soil area may be exposed to induce evaporation and reduce the amount of heat stored in the soil, so that the necessary conditions of heat and moisture in the soil to produce the best effects in promoting the growth and development of the plant may be obtained and maintained.

Obviously the individual sections 11 and '11', described as excised from the body of the mulsh, may, if desired, be formed independently of the mulsh, but applied in the same manner as the sections thus excised, and, in order to produce the widest range of variation of the evaporation openings or areas, the sections should in each instance correspond substantially in area with the openings in the body of the mulsh, so as to practically close the openings against evaporation effects, on the one hand, and to provide maximum openings such as 12 and 12' when it is desired to evaporate relatively large proportions of the moisture collected in the soil. Under all conditions, however, the relation of the sections 11 and 11' to the body of the mulsh should be such as to permit of moisture, either from rains or artificially supplied to the surface of the mulsh, draining through the openings between the sections and body of the mulsh to form zones of moisture in the soil surrounding the planting areas.

What I claim is:

1. A mulsh for enhancing the growth of plants comprising a body portion having an opening therein, and a separate section of substantially the same shape and area as the opening adapted to be adjusted with respect to the body portion to regulate the extent of the soil area exposed through said opening, said section having a central planting opening therein.

2. A mulsh for enhancing the growth of plants comprising a body portion having an opening therein, and a separate section of substantially the same shape and area as the opening adapted to be adjusted with respect to the body portion to regulate the extent of the soil area exposed through said opening, said section having a central planting opening therein and foldable flaps surrounding the planting opening.

3. A mulsh for enhancing the growth of plants comprising a body portion having an opening therein, and a separate section of substantially the same shape and area as the opening adapted to be adjusted with respect to the body portion to regulate the extent of the soil area exposed through said opening, said section having a central planting opening, therein, foldable flaps surrounding the planting opening and means to lock said flaps in open position.

4. A mulsh for enhancing the growth of plants comprising a strip of flexible, water proof material having openings therein spaced at intervals, a separate section for each opening of substantially the same shape and area as the corresponding opening and adapted to be adjusted with respect to the opening to regulate the extent of the soil area exposed through said opening, each section having a central planting opening therein.

5. A mulsh for enhancing the growth of plants comprising a strip of flexible, water proof material having openings therein spaced at intervals, a separate section for each opening of substantially the same shape and area as the corresponding opening and adapted to be adjusted with respect to the opening to regulate the extent of the soil area exposed through said opening, each section having a central planting opening therein and foldable flaps surrounding the planting opening.

6. A mulsh for enhancing the growth of plants comprising a strip of flexible, water proof material having openings therein spaced at intervals, a separate section for each opening of substantially the same shape and area as the corresponding opening and adapted to be adjusted with respect to the opening to regulate the extent of the soil area exposed through said opening, each section having a central planting opening therein, foldable flaps surrounding the planting opening and means to lock said flaps in open position.

7. A mulsh for enhancing the growth of plants comprising a body portion and sections of geometrical form cut at intervals from the body portion to form corresponding openings in the latter, each section being adjustable with respect to the corresponding opening to vary the area of said opening, each section having a central planting opening therein.

8. A mulsh for enhancing the growth of plants comprising a body portion and sections of geometrical form cut at intervals from the body portion to form corresponding openings in the latter, each section being adjustable with respect to the corresponding opening to vary the area of said opening, each section having a central planting opening therein and foldable flaps surrounding said planting opening.

9. A mulsh for enhancing the growth of plants comprising a body portion having an opening therein, and a separate section of substantially the same shape and area as the opening adapted to be adjusted with respect to the body portion to regulate the extent of the soil area exposed through said opening, said section having an opening therein for the accommodation of a plant.

In testimony whereof I affix my signature.

CHARLES F. ECKART.